(12) United States Patent
Volpe et al.

(10) Patent No.: US 10,228,852 B1
(45) Date of Patent: Mar. 12, 2019

(54) MULTI-STAGE COUNTERS

(71) Applicant: Amazon Technologies, Inc., Seattle, WA (US)

(72) Inventors: Thomas A. Volpe, Austin, TX (US); Mark Anthony Banse, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 232 days.

(21) Appl. No.: 15/081,628

(22) Filed: Mar. 25, 2016

(51) Int. Cl.
*G06F 12/00* (2006.01)
*G06F 3/06* (2006.01)

(52) U.S. Cl.
CPC .......... *G06F 3/0604* (2013.01); *G06F 3/0653* (2013.01); *G06F 3/0673* (2013.01)

(58) Field of Classification Search
CPC ..... G06F 3/0604; G06F 3/0653; G06F 3/0673
See application file for complete search history.

(56) References Cited

U.S. PATENT DOCUMENTS

| | | | |
|---|---|---|---|
| 2008/0043897 A1* | 2/2008 | Gara | H03K 23/54 377/20 |
| 2015/0365355 A1* | 12/2015 | Wang | H03K 21/026 370/412 |

* cited by examiner

*Primary Examiner* — Kalpit Parikh
(74) *Attorney, Agent, or Firm* — Kilpatrick Townsend & Stockton LLP

(57) ABSTRACT

Disclosed herein are methods and apparatuses related to the use of counter tables. A counter table can comprise a plurality of lower-level counters and an upper-level counter. A range of values capable of being represented by a lower-level counter from the plurality of lower-level counters can be enlarged by associating the lower-level counter with the upper-level counter. A counter table can be associated with a network device.

23 Claims, 13 Drawing Sheets

| 1100 | | | | | |
|---|---|---|---|---|---|
| Clock Cycle - | 1 | 2 | 3 | 4 | 5 |
| Read lower-level counter | Event 1 | Event 2 | Event 3 | Event 4 | Event 5 |
| Check if upper-level counter is associated and increment a lower-level counter | | Event 1 | Event 2 | Event 3 | Event 4 |
| If upper-level counter is associated and the lower-level counter overflows, read the upper-level counter | | | Event 1 | Event 2 | Event 3 |
| Increment upper-level counter if necessary | | | | Event 1 | Event 2 |
| Assign next upper-level counter if necessary | | | | | Event 1 |

FIG. 11

MULTI-STAGE COUNTERS

BACKGROUND

The use of counter tables (e.g., arrays of counters) can enable many functions of computer systems, including functions associated with collecting statistics, routing network traffic, and organizing cache structures, for example. As computer systems become more complex, the size and complexity of counter tables can correspondingly increase to accommodate needs of the ever advancing computer systems. As such, counter tables are becoming increasingly unwieldy, requiring increasingly large amounts of memory for their storage. This unwieldiness can lead to inefficient allocation of available memory in a device and/or inefficient allocation of an amount of physical memory to a particular device. This is especially true in integrated applications of counter tables where memory space can be more of a concern due to size, power, and cost constraints of integrated devices. Thus, there is need for improvement in the field of counter tables.

BRIEF DESCRIPTION OF THE DRAWINGS

Various embodiments in accordance with the present disclosure will be described with reference to the drawings, in which:

FIG. 11 illustrates a pipelining diagram can embody techniques of the disclosure.

DETAILED DESCRIPTION

Figure 1:
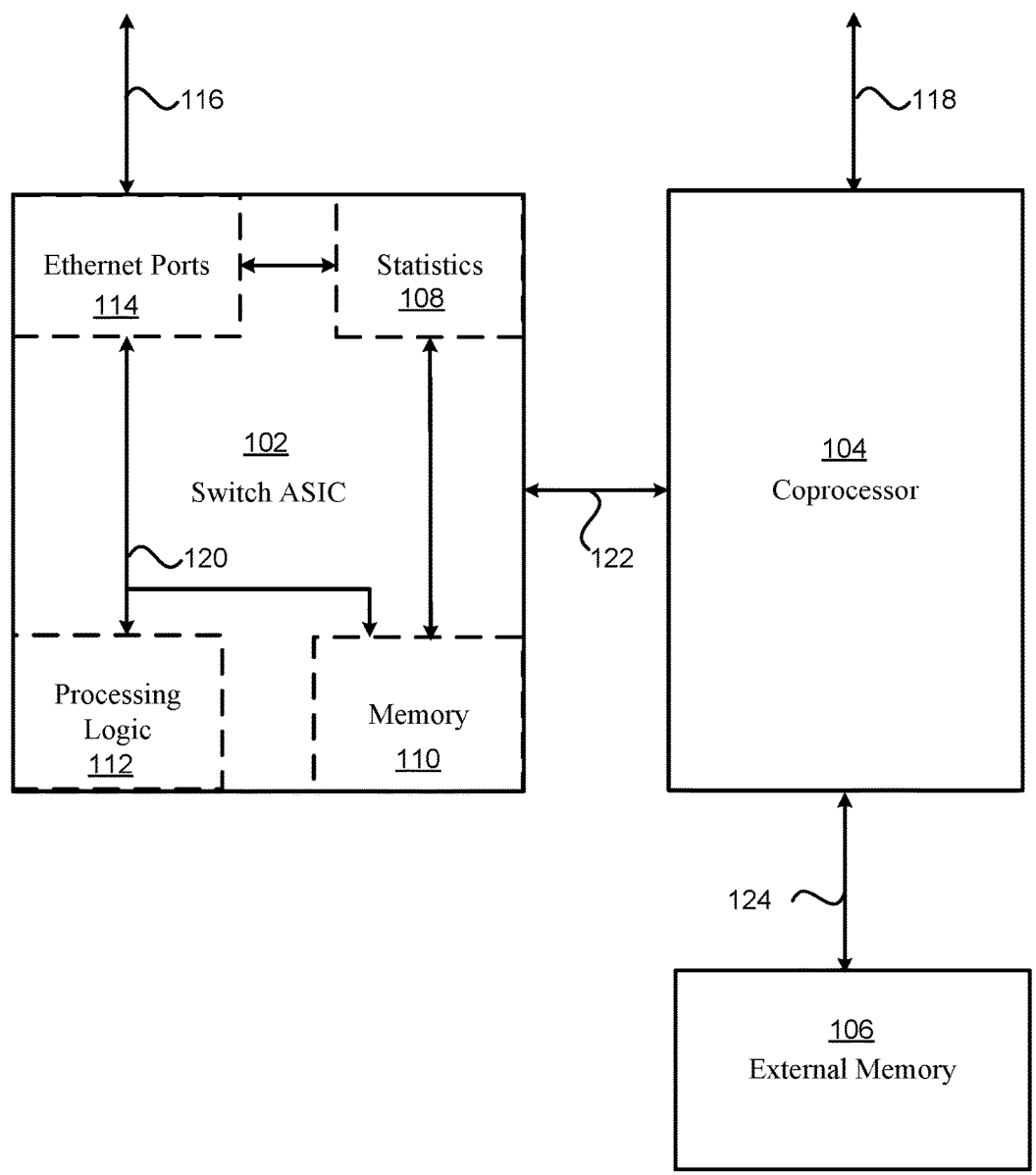
FIG. 1 illustrates a system that can embody techniques of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Disclosed are techniques that can be used for improving the efficient use of or the amount of memory used to implement a counter table, for example. By more efficiently allocating memory to a counter table, the amount of memory needed to implement a particular counter table can be minimized. If the counter table is implemented within an integrated device's onboard memory, for example, the amount of onboard memory can be reduced while still allowing a counter table to be used that meets the integrated device's performance requirements (e.g., number of events that can be stored in a given time period, speed of operation, etc.). Alternatively or additionally, for a given memory size in which a counter table is stored, the amount of available memory space after implementing a particular counter table can be increased or maximized using techniques disclosed herein.

Techniques described herein include methods and apparatus for implementing a counter table using minimal memory allocated to the counter table while still maintaining certain performance characteristics of counter tables. Counter tables can be arrays of elements, wherein each element can be changed to "count" or otherwise account for an event or a change in a device or system. For example, a counter table can have three elements each assigned to represent a count of, for example, a direction a car takes at a four way intersection (straight, left, or right). As a car drives through one of these directions, a corresponding element of a counter table can be updated. If, for example, two cars turn left at the intersection, an element associated with the left turn can represent a value of two, and so on. Although this is a simplistic example, it aids in understanding of how such tables operate to aid in the understanding of techniques of the disclosure.

One example use case of a counter table is for use in association with a network switch. Network switches can utilize various tables to compile statistics for, as an example, routing tables or access control lists. As one example, a routing table can contain entries associated with forwarding of data packets received or generated by a device. A counter table can be associated with the routing table and can, for example, include a counter for each entry of the routing table. Each counter can be incremented or otherwise updated when a particular entry of a routing table is accessed or updated to collect statistics regarding the use of the routing table that can further be divided into statistics for a specified period of time. These statistics can be used to improve the functioning of the switch by more efficiently routing network packets, assessing the health of the switch, scheduling maintenance actions for the switch, measuring utilization of resources, or other activities for other reasons. It should be understood that such counter tables may operate at high speeds to accommodate correspondingly high network packet rates. As such, counter tables can be physically integrated in close proximity to network switching logic to decrease latencies associated with accessing counter tables. Sometimes, the counter tables are integrated within a same integrated circuit die as associated networking logic.

As such circuits become increasingly more integrated, memory space allocations for counter tables can become an increasing concern. Minimizing, or at least reducing, memory space allocation can reduce the cost, power usage, and/or size of memory allocated for the counter table(s) and therefore reduce the cost, power usage, and/or size of an integrated circuit containing the memory.

One challenge when designing a counter table is to ensure that the counter table is able to record a sufficiently large number of events. Many implementations of counter tables, including many for use with network devices, can be non-deterministic. That is to say, until an event triggering an update to a counter table element occurs, it is not known which counter table element of the counter table will be modified. In other words, one may not know the distribution of values that will populate the counter table until the counter table has been populated. As such, counter tables can be designed to accommodate corner or "worst case" scenarios.

As one such corner case, a single counter table entry may be associated with and thus record all events that a counter table can be subjected to in a given time period (e.g., only one counter table entry is incremented and the remaining are not). As disclosed herein, as the updating of the counter table can be non-deterministic, any element of the counter table may receive all such events for a given time period and therefore every element may be configured to store all events that the entire counter table may be subjected to. At the end of this time period, the counter table can be read and reset or otherwise cleared. The values of the counter table entries can likewise be accumulated in another memory location (using a higher latency, lower cost, larger external memory, for example). One method to implement a counter table to account for these corner cases is to configure each counter table element to store the maximum range of values that the entire counter table may be subject to within a given time period. However, in such an arrangement, the remaining counter table elements may not be used in a given time period and the majority of the counter table entries can remain unused. In other words, for a given time period, a set number of events can be distributed between any entry of a counter table even though each entry of the counter table can be configured to store the total number of events for the time period.

Disclosed herein are techniques to improve the efficient use of memory to store counter tables by enabling dynamic allocation of memory to one or more elements of a counter table, thereby enabling the one or more elements to store an increased range of values as needed. Given the above example, wherein in a set time period, a certain number of events occur within a certain time period, the disclosed techniques enable a subset of the elements of a counter table to be dynamically enlarged to be capable of storing the number of events. The remaining elements can therefore be implemented with less memory space, allowing more efficient use of more memory space for implementation of counter tables.

The techniques disclosed herein can utilize a pool of lower-level counters and a pool of upper-level counters. The lower-level counters can each be assigned to a category of events that the counter table is associated with so that each lower-level counter can record a value representing a change in a specific event. The upper-level counters can be held in reserve to enable dynamic enlargement of a range of values capable of being stored in a lower-level counter. In some implementations, any of the lower-level counters can be enlarged through the use of an upper-level counter by including a tag in the lower-level counter that references the associated upper-level counter. In this manner, a portion of a lower level counter can be repurposed depending upon if the lower-level counter is associated with an upper-level counter, as will be described herein.

FIG. 1 illustrates an implementation of a networking device 100, which can be a network switch or a network router, for example. Networking device 100 can include a switch (Application Specific Integrated Circuit) ASIC 102, a coprocessor 104, and/or external memory 106. Switch ASIC 102 can be configured to interface 116 with a plurality of differing networking devices (not shown). For example, Switch ASIC 102 can interface with personal computers, network switches, network hubs, mobile devices, or other network devices. Switch ASIC 102 can include one or more Ethernet Ports 114 to enable network communications with network devices (not shown). Ethernet Ports 114 can enable network communications using Transmission Control Protocol/Internet Protocol (TCP/IP), Domain Name System (DNS), Hypertext Transfer Protocol (HTTP), Dynamic Host Configuration Protocol (DHCP) or other protocols. Ethernet Ports 114 can also implement various speeds and methods of transmission such as 100 Gigabit (G), 10G, 1G, wired or wireless transmissions. Switch ASIC 102 can also include a Statistics block 108, a memory block 110, and/or a processing logic block 112.

Statistics block 108 can include logic and/or memory to obtain and/or log statistics related to the functioning of Switch ASIC 102. For example, statistics block 108 can include one or more counters or counter tables to record various information concerning events associated with network packets received by Switch ASIC 102. For example, statistics block 108 can include counter table entries for recording statistics concerning routing table entry hits, ACL table entry hit counters, or various other counters that may or may not be associated with networking tasks. Statistics block 108 can also include logic to update/modify counters or counter tables stored within memory block 110. Statistics block 108 can include memory or access memory 110. Memory block 110 can be dedicated memory or shared memory, such as by various blocks of Switch ASIC 102. Memory block 110 and/or memory stored within statistics block 108 can be static Random Access Memory (RAM), dynamic RAM, double date rate RAM, flip-flops, or other types of memory.

Switch ASIC 102 can also include processing logic block 112 that can include various logic gates and/or functions. Processing logic block 112 can include functionality of a processor core such as an x86 or ARM® compatible processor core, for example, can implement one or more fixed function units, Field Programmable Gate Array (FPGA) logic, and/or the like. Various interconnects such as interconnect 120 can be used to pass information between the various blocks of switch ASIC 102. The interconnects (such as interconnect 120) can include point to point interconnect(s), common bus(es), ring buffers, combinations thereof, or other data interconnect(s).

Coprocessor 104 can include a processor core such as an x86 or ARM® compatible processor core, for example, and/or can implement one or more fixed function units, Field Programmable Gate Array (FPGA) logic, or the like. Coprocessor 104 can implement various functionalities associated with networking device 100. For example, Coprocessor 104 can be used to execute instructions that may or may not be stored in memory, such as external memory 106 and/or onboard memory (not shown). Coprocessor 104 can communicate with Switch ASIC 102 via interface 122. Interface 122 can include a Peripheral Component Interconnect (PCI), Serial Peripheral Interface (SPI), Universal Serial Bus (USB), a parallel interface, or various other topologies. Interface 124 between Coprocessor 104 and External memory 106 can similarly be configured with similar topologies.

Coprocessor 104 and/or the External Memory 106, can be used to implement a control plane for networking device 100. A control plane, as used herein, can be a functional representation of a network device that concerns routing or control of network packets. In other words, a control place can be used to orchestrate the movement of data packets through a network device or through a network comprising multiple devices. Ethernet Ports 114 (and/or Coprocessor 104, Processing Logic 112, Memory 110) can be used to implement a data plane for networking device 100. A data plane, as used herein, is a functional representation of a network device concerning carrying/movement of data packets. In other words, the control plane directs the traffic through a network or network device while the data plane performs the actually movement of the data.

Statistics block 108 can aid in the functioning of the control plane by collecting statistics concerning packets as they move through networking device 100. For example, a routing table of the Statistics block 108 can be used to measure the number of packets sent or the amount of bandwidth transferred between networking device 100 and particular network destinations, as the network is currently configured. As the network topology changes, the routing table can be updated accordingly to reflect these changes. The routing table can be used by the networking device 100 to optimize prioritization of the transfer of data packets along with, for example, Quality of Service (QOS) or other optimizations. An Access Control List (ACL) can be a list of permissions and actions that can further enable or disable flows of traffic that are using certain port numbers and/or IP addresses. The ACL and/or the routing table can each be associated with a counter table to temporarily store statistical information concerning the access of certain paths through the network or nodes and/or devices that networking device 100 interfaces to, for example. Although, only the ACL and the routing table are used here as examples, it should be understood that various other functions (even outside of the context of a network device) can be associated with and/or use the functionality of a counter table and benefit from the techniques disclosed herein. As one such example, a device cache can use a counter table to increment cache hits and/or misses. As such, this disclosure is not limited to a counter table for use with only a networking device such as networking device 100, but can be used in a wide variety of devices for a wide variety of purposes.

Referring to FIG. 1, statistics block 108 can be configured to store statistical information in counter tables, as disclosed herein. Due to the high speed nature of some networking devices and the corresponding speed at which network data packets are transferred, it can be beneficial to implement counter tables related to network traffic locally. For example, counter tables may be implemented within switch ASIC 102 such as in Statistics block 108 or in memory 110. As such, the implementation of the counter tables can increase the size, cost, and/or power consumption of switch ASIC 102. In order to, for example, optimize die size and latency requirements, local counter tables implemented on Switch ASIC die 102 can be used in conjunction with counter tables and/or other statistics storing mechanism in Coprocessor 104 or external memory 106, for example. As one implementation, counter tables of switch ASIC 102 can periodically be read, tallied, and cleared using coprocessor 104. Using such a mechanism, counter tables of switch ASIC can provide the ability to record information regarding relatively high speed transactions in a limited space. Coprocessor 104 can then periodically collect and compile these statistics using higher latency, larger but less costly memory. Given the above schema, there can be a correlation between the size of an on-die counter table and the number of events that the on-die counter tables can store. As an example, if an on-die counter table cannot store enough information, it (or an entry of the counter table) can overflow and therefore fail to store accurate counter data, become corrupted, and/or cause an interrupt that may slow the system or result in additional faults. If on-die counters tables are too large, the cost and power usage of keeping so many statistics may become undesirable. In a networking environment, the speed at which events are processed can be associated with the speed at which network events occur. Therefore, the faster the delivery of network packets, the faster that associated on-die counter tables may need to be updated. As such, the speed of networking device 100 can be a factor in determining the optimal size of the counter tables. Additionally, the speed of networking device 100 can be associated with the periodicity at which on-die counter tables are read and cleared.

Figure 2:
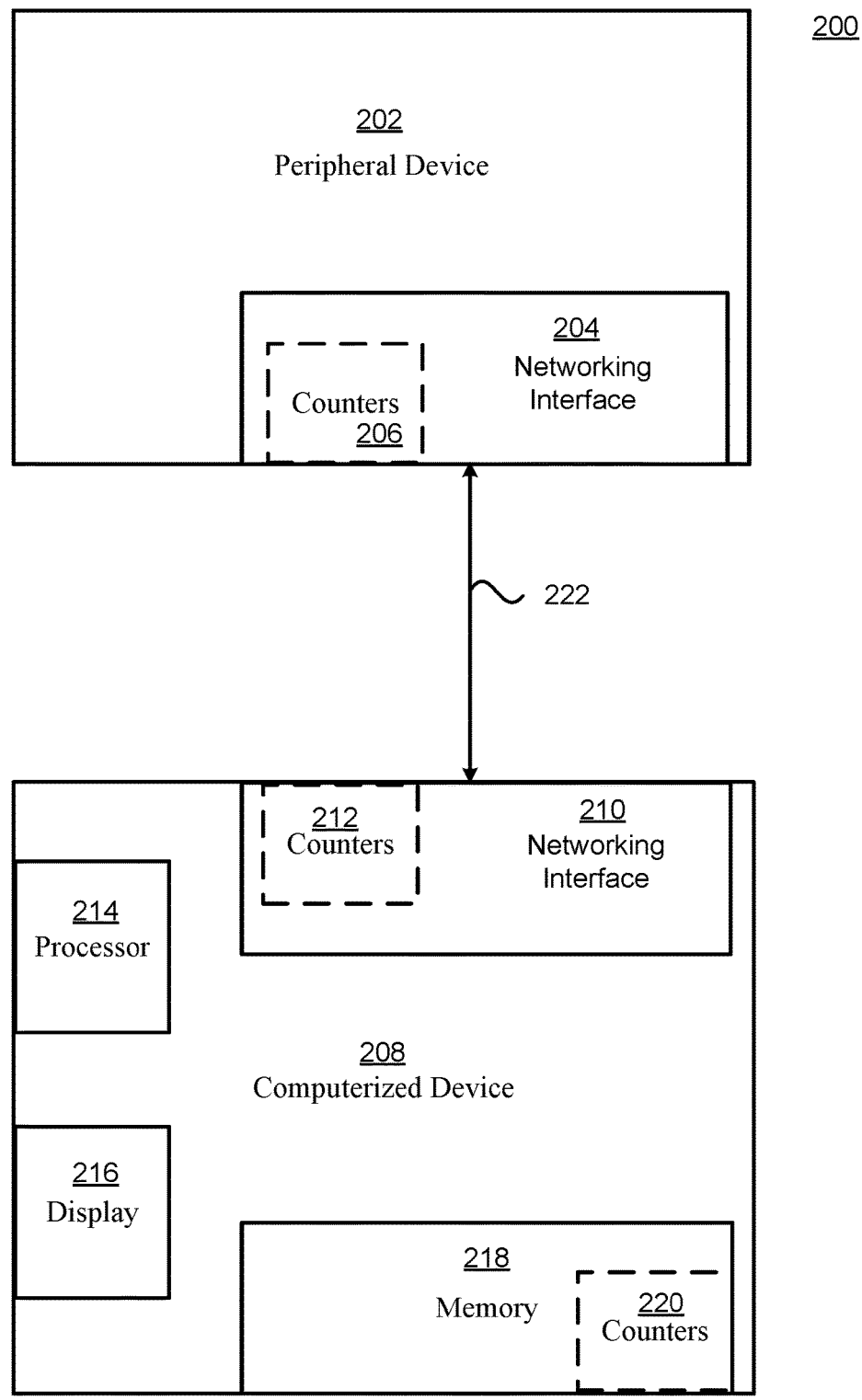
FIG. 2 illustrates another system that can embody techniques of the disclosure.

FIG. 2 illustrates various devices that can implement techniques disclosed herein. System 200 can include a networking device 202 that can be a network or other device, such as a server, a network attached storage server, an offload device, a switch, or other. Networking device 202 includes a networking interface 204. Networking interface 204 can include memory (not shown) that can include counters 206. The counters 206 can be implemented via a counter table or other such schemas. Using the techniques disclosed herein, the amount of memory required to implement the counters 206 can either be minimized or used more efficiently.

Also illustrated is computer device 208. Computer device 280 can include memory 218, networking interface 210, processor 214, and/or display 216. Computer device 208 can be a personal computer, a tablet, cellular phone, or other device. Networking interface 210 can include memory (not shown) that can include counters 212. Memory 218 can also include counters 220. Memory 218 can be static memory, dynamic memory, a combination thereof and can implement various memory technologies. Networking interfaces 204 and 210 can implement similar memory devices and topologies. Although not shown, processor 214 can include memory for local storage of variables in registers or cache, for example. Display 216 can be a cathode ray tube, flat-panel display, projection display, haptic feedback system, or various other user interface systems. Using interface 222, as an example, computer device 208 can communicate with and utilize functionality of networking device 202. Such typologies are becoming more commonplace with the popularity and wide use of personal computer devices such as smart phones, watches, and other wearable tech that may have limited onboard storage and capabilities. Such devices can therefore benefit from accessing more robust features of connected peripheral device(s) such as networking device 202.

FIG. 2 illustrates various embodiments of the disclosure. Although the disclosure highlights the usefulness of techniques to improve the efficient implementation of counter tables via network devices, it will become apparent from the disclosure that the techniques disclosed herein can also be implemented in various devices. The various devices do not necessarily need to be network attached to benefit from the teachings herein. For example, counter tables implemented by processor 214, such as within its cache (not shown), can also be improved through the use of techniques of this disclosure. Additionally, a singular device can implement the technique of the disclosure in multiple and varying instances. As illustrated, computer device 208 includes counters 212 and counters 220. Counters 212 and counters 220 can be associated with various functions of computer device 208 or they can be associated with the same function. For example counters 220 can be an extension of counters 212 or vice-versa.

Figure 3:
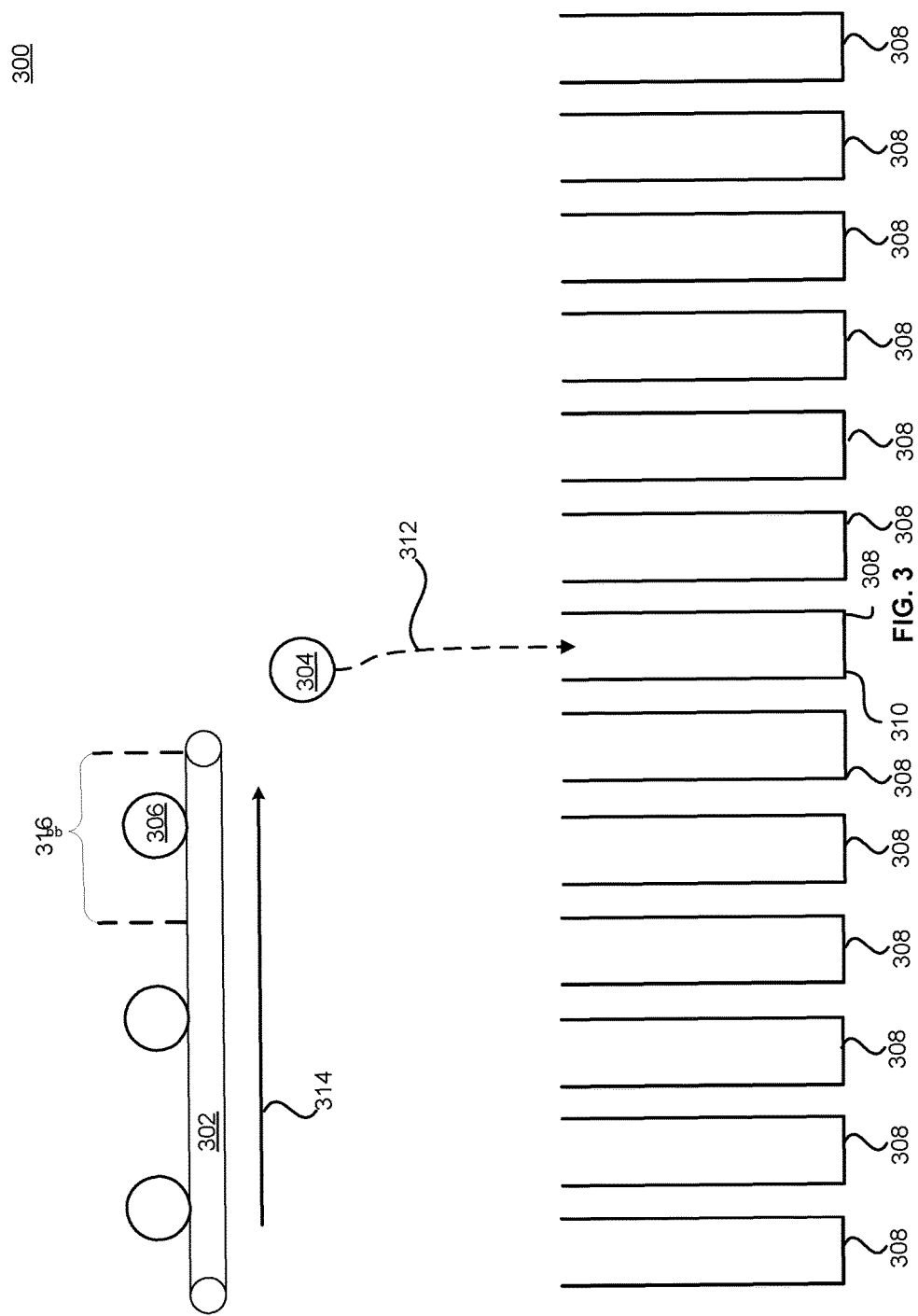
FIGS. 3-5 illustrate a counting system to illustrate several aspects of the disclosure.

FIGS. 3-6 are provided to illustrate various features of the disclosed methods and apparatuses so that exemplary advantages of various embodiments of each can be more easily understood. FIG. 3 illustrates a counting system 300 including an event provider 302 where in various events (for example, event 304 and event 306) are carried in direction of arrow 314 and eventually fall to one of a plurality of counters 308. Although not shown, a mechanism can select which of counters 308 an event is dropped into. As illustrated, event 304 is dropped 312 into counter 310. The counting system 300 can be thought of as a sorting apparatus wherein each of counters 308 is a classifier or counter for the events.

Each event (304, 406, etc.) can be considered an event to be counted by the counting system 300 and can encompass a counter table. Each of counters 308 can be a counter of the counter table. Thus, when a event (such as event 304), is sorted into counter 310, counter 310 is incremented. By sorting each event into a corresponding counter 308, each of the events can be classified and accounted for within the counter table. Additionally, a time period 316 is illustrated with event 306 falling within time period 316. If the events are provided at a constant rate, such that each one of the event falls within a constant time period 316, then the rate that the events are provided can be thought of as a sampling rate. The sampling rate can be correlated with the speed that the counter table is updated at. Also, if the counter table is associated with a network device, then the rates can be associated with the speed of the network device. It should be understood that in the simplified system of 300, only a single event is provided for a single time period 316. However, the event provider could provide multiple events within a single time period 316 or varying numbers of events within each time period.

Figure 4:
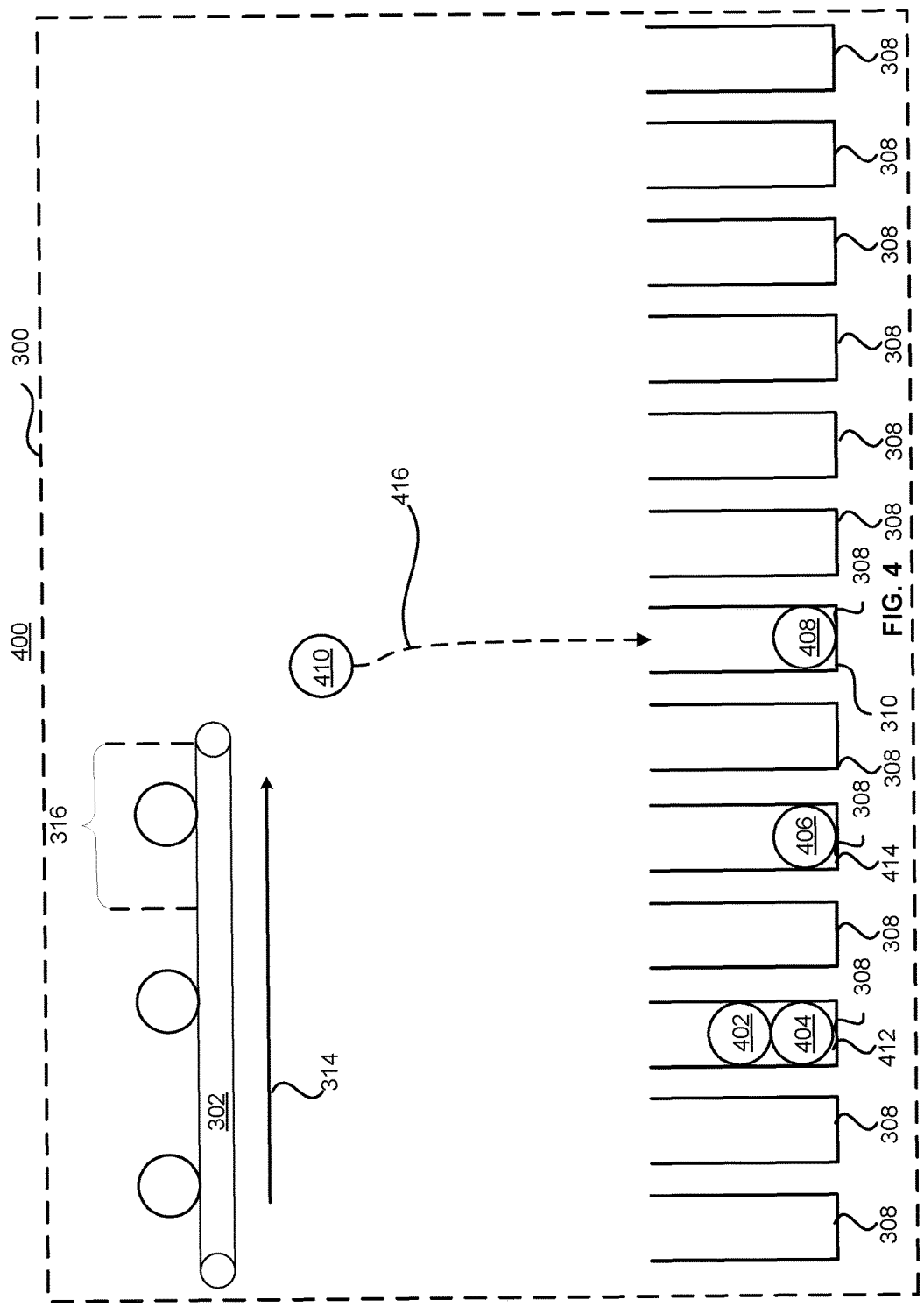

Referencing now to FIG. 4, illustrated is a state 400 of operation of counting system 300, wherein several events have been counted. In this example, events 402 and 404 are contained in counter 412. Therefore, counter 412 has a count value of two. Similarly, counter 414 is populated with a single event 406 and a count value of one. Counter 310 contains a single event 408. However, counter 310 is in the process of receiving/counting 416 a new event 410 and will have a counter value of two upon completion of the counting of event 410 by counter 310.

Figure 5:
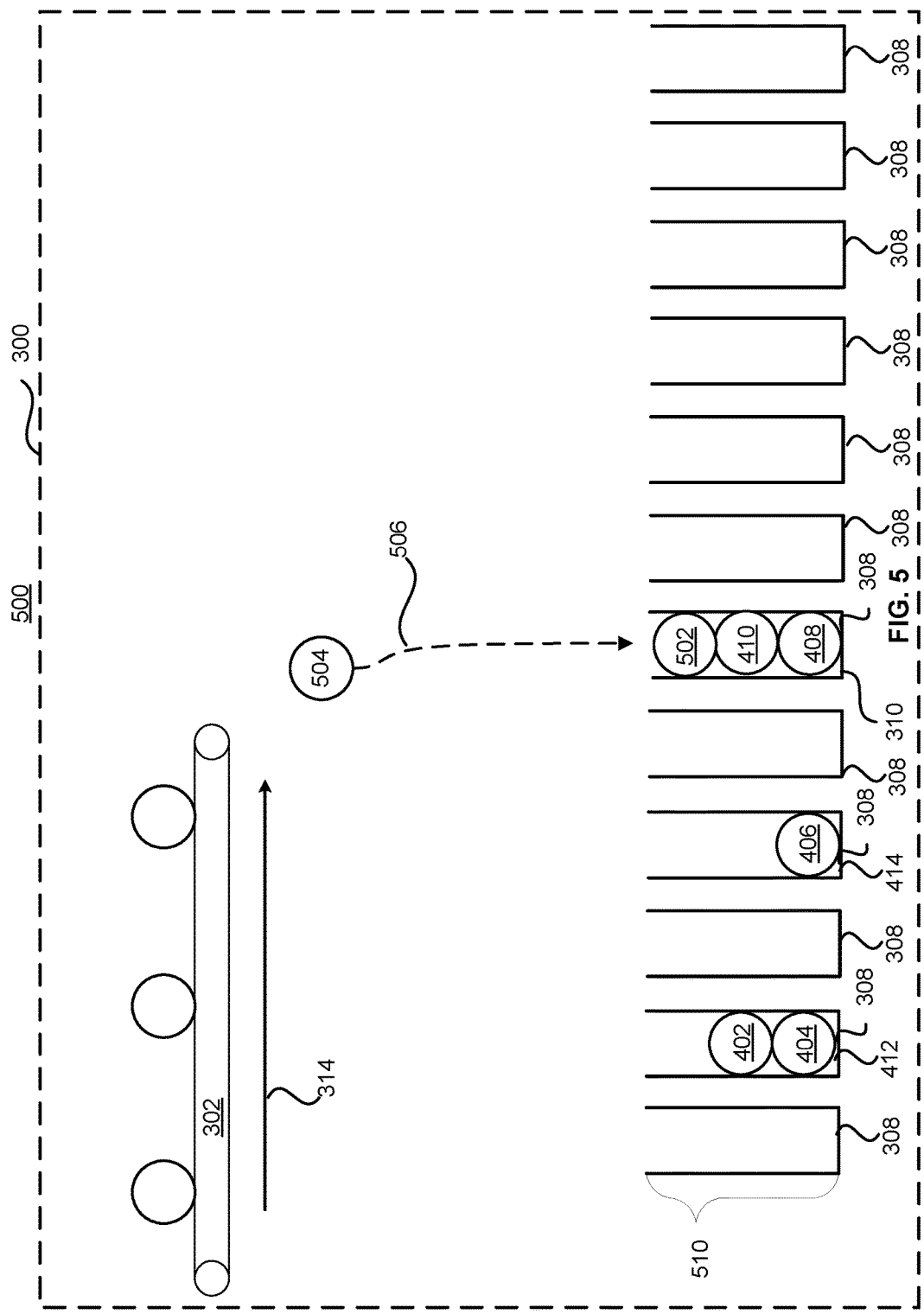

FIG. 5 illustrates another state 500 of counting system 300. The state 500 of counting system 300 has progressed such that the counting system 300 has sorted several events into counter 310. As illustrated, counter 310 is now at full capacity. If the system attempts to tally 506 event 504 using counter 310, counter 310 will overflow. Although the term overflow, as used in the illustration FIG. 5, can be thought of as the counter 310 being at capacity such that any new events will spill over the bounds of the counter 310, it should be understood that the term overflow can also apply to a digital representations of the counting system. Each of counters 308 can be represented digitally such as in computer memory. As one example, counter 310 can be represented with two bits, as the maximum number of values that counter 310 can account for is four (0, 1, 2, or 3). This is because in a binary representation, numbers can be represented by a base 2 numbering system and, with two bits, there can be four possible values (2^2). The number of bits that each of counters 308 can store can be analogized to the height 510 of each of the counters 308 of FIG. 5. Additionally, the amount of memory that can be required to store the counters 308 can be thought of as the number of counters times the number of bits of each counter. Therefore, in order to account for more values in each of counters 308, the counters 308 must generally be enlarged/have more bits assigned to them. Therefore, to account for more values, a counter table comprising the counters 308 may require more memory to be allocated to the counters 308.

Additionally, as disclosed herein, a counter system can be nondeterministic. Referencing now FIG. 5, this can mean that any of counters 308 may reach capacity during a given time period. Therefore, given the topology illustrated in FIG. 5, each of the counters 308 would either need to be enlarged to account for more events or the whole system purged after three events are deposited in any combinations of counters 308 to ensure that no overflow of a counter 308 occurs. Because purging periods can be dictated by hardware limitations (such as latencies associated with memory to store the cumulative values of the counters), the approach of enlarging each of counters 308 can appear attractive as one solution to enable counting of more values without comprising the speed at which values are counted. However, enlarging each of counters 308 necessitates the use of more memory. Additionally, assuming that the counting system 300 of FIG. 5 is purged after every three events, all counters 308 except counter 310 would be empty when counter 310 contains the three events illustrated. This usage of memory can be inefficient as the majority of counters 308 are unused and therefore the majority of the memory allocated to a counter table can be unused for any given purge cycle.

Figure 6:
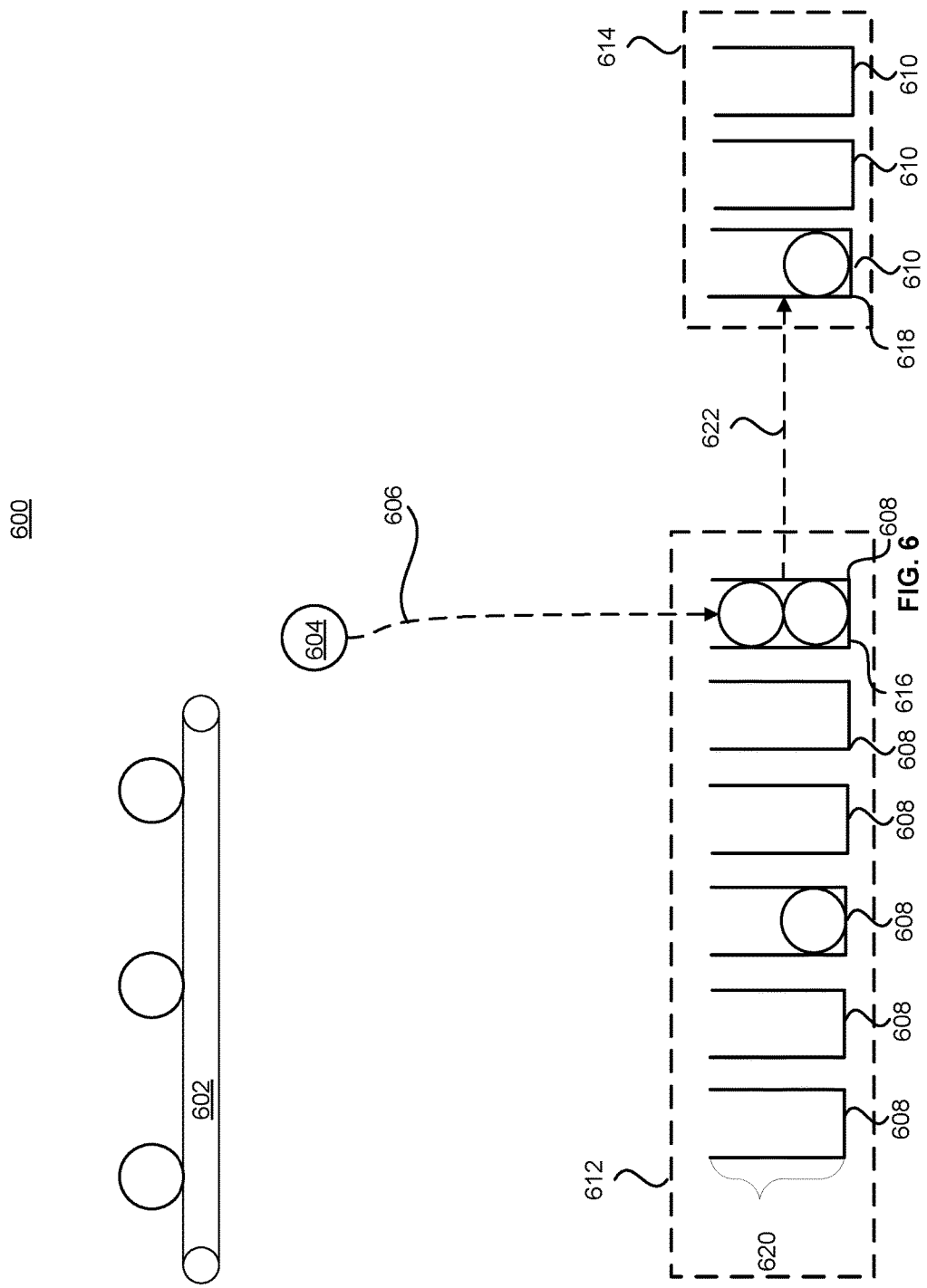
FIG. 6 illustrates another counting system that can embody techniques of the disclosure.

Referencing now FIG. 6, illustrated is a counting system 600 similar to the counting system 300, event provider 602 can be correlated to event provider 302. Additionally, counting system 600 tallies events similar to the process described for counting system 300 via FIGS. 3-5. However, counters 608 are arranged differently in counting system 600 as compared to the counters 308 of counting system 300. More specifically, counting system 600 includes two sets of counters. The first set 612 can be referred to as lower-level counters 608. The second set 614, can be referred to as upper-level counters 610. Upper-level counters 610 can be thought of as overflow counters as will become apparent from the disclosure. As shown in FIG. 6, each of the lower-level counters 608 can only store up to two events before overflowing because of the height 620 of each of the lower-level counters 608. Upon the overflow of a lower-level counter 608 of the counting system 600, as illustrated in the overflowing of lower-level counter 616, an upper-level counter can be associated with a lower-level counter. Lower-level counter 616 is illustrated as being associated 622 with upper-level counter 618. Therefore, when event 604 is counted 606 by lower-level counter 616, instead of an overflow occurring, upper-level counter 618 can be incremented. In this manner, the range of values capable of being stored by lower-level counter 616 can be increased without directly increasing the size of lower-level counter 616. Additionally, it should be understood that the number of lower-level counters 608 and the number of upper-level counters 610 can be selected to optimize a memory size allocated to the counting system 600, as can the size of lower-level counter 608 and upper-level counter 610. Furthermore, the size of each of upper-level counters 610 need not equal the size of lower-level counters 608. Counting system 600, as illustrated, can advantageously count a maximum of four events without incurring an overflow (assuming a one-to-one correlation of lower-level counters 608 to upper-level counter 610) without requiring each of lower-level counters 608 to be able to individually store four events. Counting system 600 can thus be implemented with less memory than an equivalent system using the topology of counting system 300 (wherein each of lower-level counters 608 would be required to store four values and there would be no upper-level counters 610).

Figure 7:
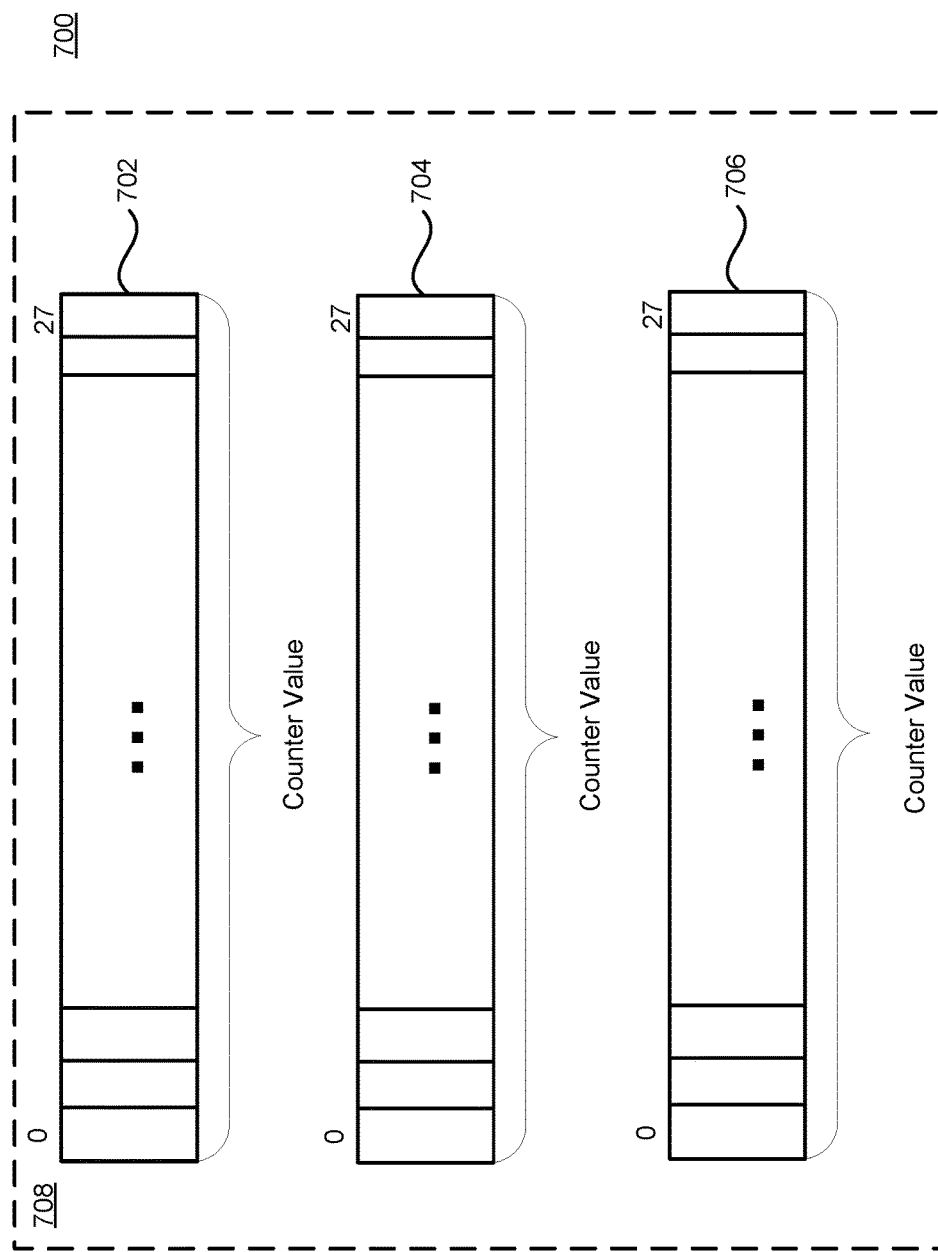
FIG. 7 illustrates counters of a counter table.

FIG. 7 illustrates a notional counter table 700 implementing the counting schema illustrated by counting system 300. Counter table 700 includes a plurality of counters. Illustrated are three of such counters, namely 702, 704, and 706. Each of the counters of counter table 700 operate at a single level. That is to say, there is no association between counters of counter table 700 to an upper-level counter. Similar to the discussion provided herein for the functioning of counting system 300, given an incremental counter updating system and a given total number of nondeterministic events to be counted, each of counters 702, 704, and 706 may be configured to store the total number of nondeterministic events. Because the events to be counted can be nondeterministic, one may not know how the events will be distributed in the counters of counter table 700 during a given time period. Therefore, any counter of counter table 700 may need to individually store the total number of events because the total number of events can be categorized within any one counter of the counter table 700. In the counter table 700, each of the counters comprises 28 bits. Assuming that each counter is an unsigned integer, each counter can store 2^28 events. Additionally, the amount of memory needed to store counter table 700 is minimally a number of counters times 28 bits and, as explained for the counting system 300, if one counter comprises all of the events for a given time period then the remaining counters will store zero events. In other words, a total number of events can be distributed throughout the table array in any manner for any given time period and the remaining space of the counter table 700 not storing the total number of events can be unused.

Figure 8:
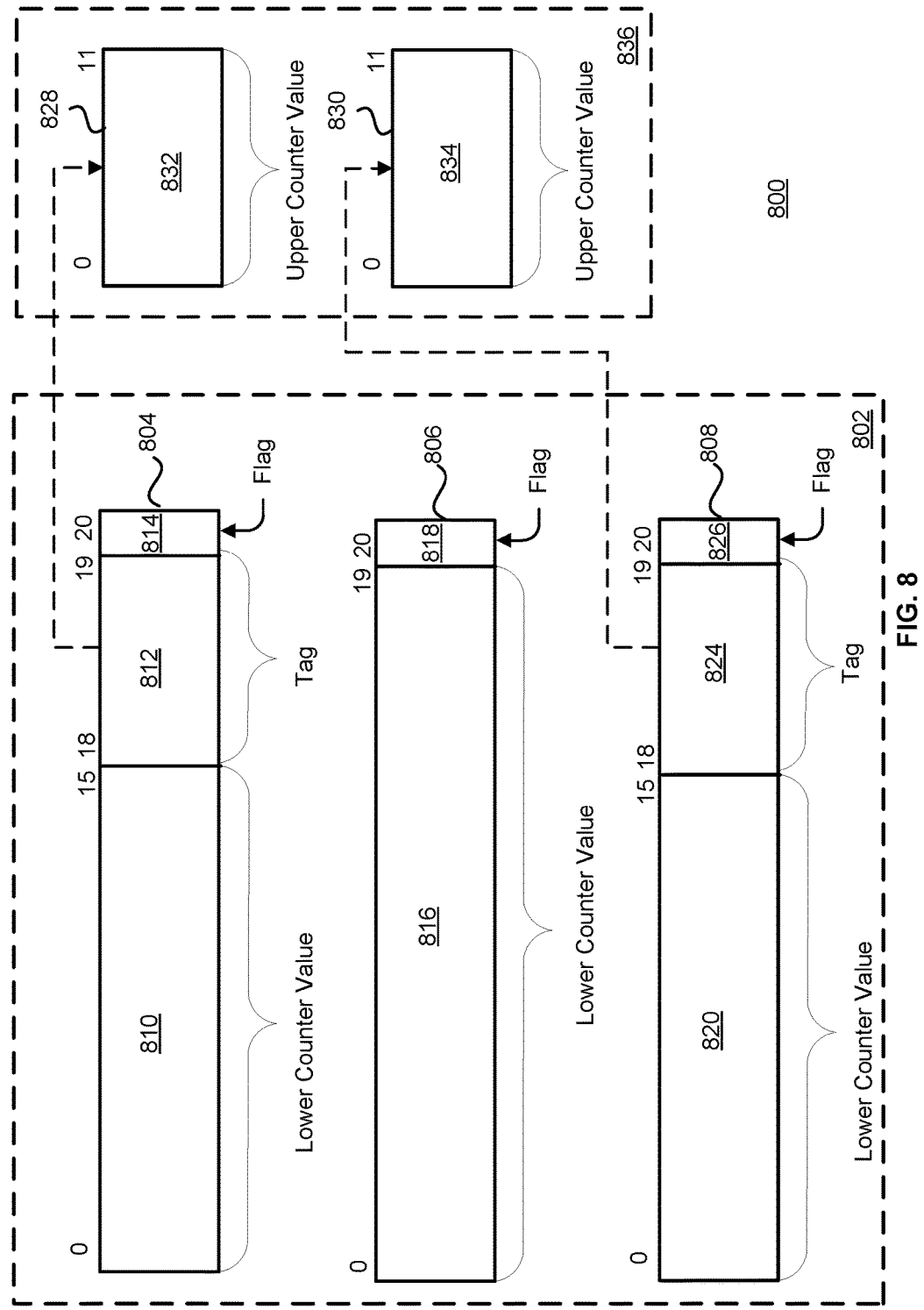
FIG. 8 illustrates counters of a counter table that can embody techniques of the disclosure.

FIG. 8 illustrates a notional counter table 800 implementing the counting schema illustrated by counting system 600. Counter table 800 includes two categories of counters, lower-level counters 802 and the upper-level counters 836. Lower-level counter 804 is illustrated as comprising three separate fields. These are the lower counter value field 810, the tag field 812, and the flag field 814. Lower-level counter 806 is illustrated as having two fields, namely lower-level counter value 816 and flag 818. The flag fields can be used to indicate whether or not a given lower-level counter is associated with a corresponding upper-level counter. The state of the flag can indicate how the bits of a lower-level counter can be interpreted. In other words, the state of a flag can indicate what states the lower-level counter is in (e.g., associated with an upper-level counter or not).

A state of flag 818 can indicate that lower-level counter 806 is not associated with an upper-level counter. While in this state, more bits can be allocated to the lower-level counter value because no bits need to be used for a tag indicating and/or referencing which upper-level counter the lower-level counter is associated with. Lower-level counter value 816 of lower-level counter 806 is illustrated as comprising 20 bits. Lower-level counter 806 can therefore store 2^20 values.

A system implementing counter table 800 can, upon detection of an overflow, change the state of flag 818 to indicate that a lower-level counter is to be associated with an upper-level counter in order to extend the range of values that the counter can store. Lower-level counters 804 and 808 are each illustrated as being associated with a corresponding upper-level counter. Therefore the state of flags 814 and 826 can be different from the state of flag 818 to indicate this association.

Referencing now lower-level counter 804, lower-level counter 804 comprises a lower-level counter value 810 having 16 bits. Therefore, lower-level counter 804 can store a maximum of 2^16 values. Bits 18 and 19 of lower-level counter 804 are illustrated as comprising a tag 812. Tag 812 can include a unique identifier referencing a particular upper-level counter. In this example, tag 812 has two bits assigned and can therefore reference one of four upper-level counters, as the tag can store one of four values. In one implementation, the tag 812 is used as an index into the upper-level counters. The value of tag 812 is illustrated as being associated with upper-level counter 828. Upper-level counter 828 is illustrated as comprising 12 bits. The upper value counter bits can be used to extend the range of the lower counter value. For example, lower-level counter 804 has 16 bits assigned to store lower-level counter value 810 that can be extended with the 12 bits of upper counter value 832 of upper-level counter 828. In this manner, lower-level counter 804 used in conjunction with upper-level counter 828 can store 2^28 (2^(16+12 bits)) values.

Lower-level counter 808 can operate in much the same way as lower-level counter 804, however lower-level counter 808 is associated with upper-level counter 830. Lower-level counter 806 is illustrated as being disposed between lower-level counters 804 and 808 to illustrate two aspects of the disclosure. The first aspect is that any lower-level counter of the lower-level counters 802 can be associated with a corresponding upper-level counter of the upper-level counters 836 so long as a sufficient number of upper-level counters exist. The number of upper-level counters and the number of bits assigned to the upper-level counters or the lower-level counters can be chosen according to design requirements to optimize memory efficiency of the system, while ensuring that all events occurring during the time period will be counted This ability to update the range of lower-level counters in real time supports the needs of a nondeterministic counter table system. The second aspect is to illustrate that lower-level counter 806 is illustrated as operating in a different state as lower-level counters 804 or 808. Since any lower-level counter can be associated an upper-level counter, the change in state can change how the bits of a particular lower-level counter are interpreted. This means that lower-level counter can (for example, on overflow) be transformed into the state of lower-level counter 808. If this happens, the range of values that can be stored solely by the lower-level counter can be diminished due to the use of bits for a tag to be associated with a corresponding upper-level counter.

If lower-level counter 806 becomes associated with one of the upper-level counters 803 upon overflow, lower-level counter 806 may represent a value of 0xFFFFF, wherein each of the lower counter value 816 bits are assigned a high ("1") value. However, upon the change of state of the flag 818 indicating an association with an upper-level counter, lower-level counter 806 can only be assigned 16 bits for this value. Therefore, the associated upper-level counter is assigned an initial value of 0x4 (0b100) to account for the two tag bits that were prior to the overflow of the lower-level counter 806 part of the lower-level counter 806. A value stored by the associated of lower-level counter 806 with an upper-level counter can then represent a value of 0x100000 even though the upper level counter stores a value of 0x4. By trading off the bit width of the lower-level counters 802, the bit width of the upper-level counters 803, and the number of upper-level counters 803, the memory utilization of counter table 800 can be optimized for a given number of events counted in a given time. Bits assigned to the tag field can correspond to the number of upper-level counters. The number of lower-level counters can correspond to the number of categories of events to be counted.

Although tags 812 and 824 and are illustrated as being implemented within the memory space of lower-level counters 804 and 808 it should be understood that tags 812 and 824 can be implemented outside the memory spaces of lower-level counters without deviating from the disclosure. For example, a memory space can be dedicated for storing tags for associations between lower and upper-level counters. Registers can also be used for storing tags. Implementation of the tags can take many forms. For example, each tag can sequentially be incremented such that each tag is associated they sequentially incremented upper-level counter in memory space. Such a schema can be advantageous if, for example, the use of the counter table is implemented via pipelined operation. For example, a register (not shown) can contain the current value of the associated upper counter value to be assigned. As each upper-level counter value is assigned to a corresponding lower-level counter, the register can be incremented. In this manner, a unique upper-level counter can be associated with each lower-level counter that overflows. Alternatively, various other association schemas can be implemented without deviating from the disclosure. Tags 812 and 824 do not necessarily need to be incremented to assign an upper-level counter and can be assigned values in any other manner. Additionally, tags need not be used at all if associations are implemented in hardware. As one possible example, lower-level counters can be co-located memory such that an overflow of one lower-level counter value overflows into another lower-level counter value. In such an instance, the system can be configured to treat the two lower-level counter values as one singular lower-level counter value to extend the range of values that can be represented through the use of the combination of two or more lower-level counters. Flags 814, 818, and 826 can also be implemented within the memory space of lower-level counters, as illustrated, or can be implemented in separate memory space or in dedicated register(s). For example, a singular register contain multiple flag bits or a value to derive which lower-level counters are associated with upper-level counters.

In support of pipelined use of a counter table using the methods and apparatuses disclosed herein, the counter table can be implemented with a multi-port memory system. As used herein, the term multi-port means that the counter table can be implemented with a plurality of memory reads or writes being implemented in parallel. For example, one lower-level counter can be incremented while a different lower-level counter is read. Alternatively, multiple counter tables can be implemented or read without waiting for the completion of a singular read or write operation. Such a mechanism can aid in the high-speed implementation of a counter table such as when used in association with a high-speed network device or high-speed processing device.

Figure 9:
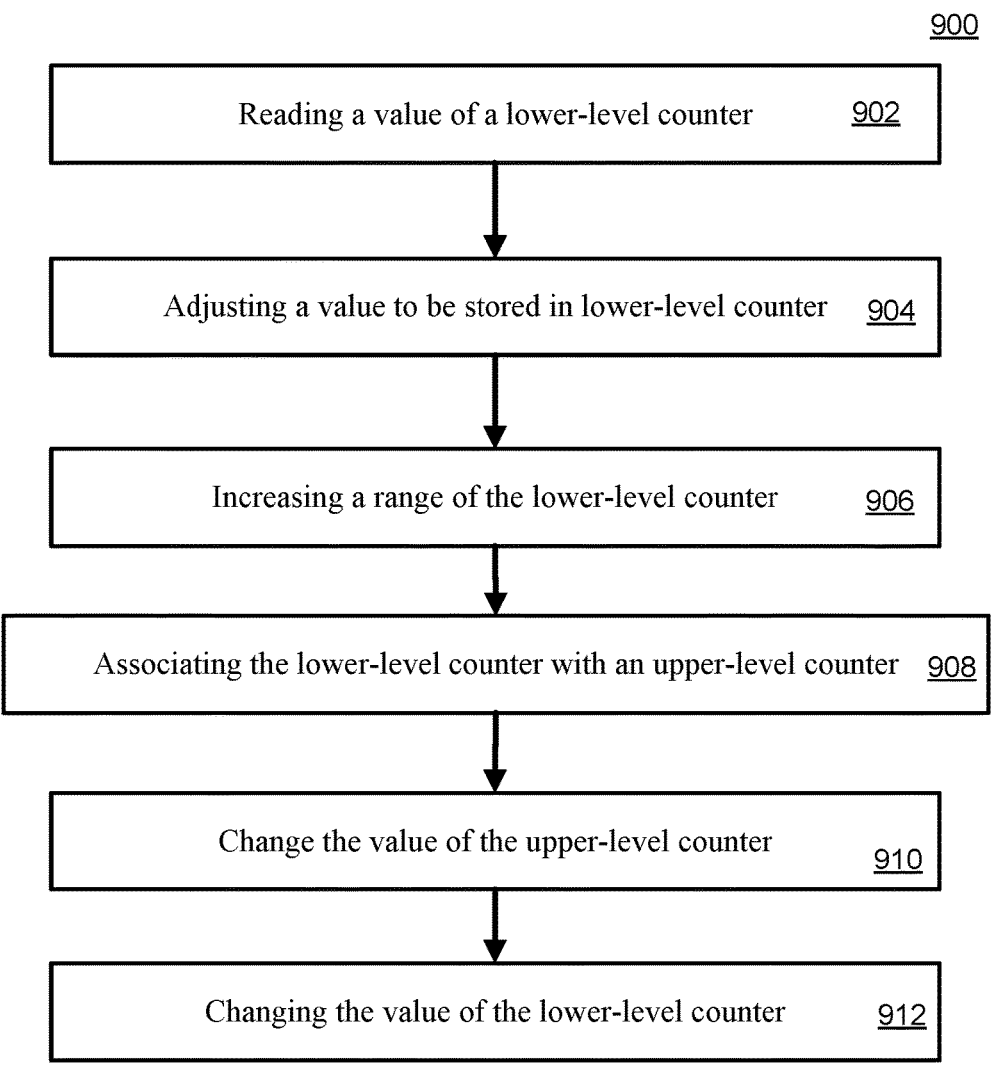
FIG. 9 illustrates a flowchart of a method that can embody techniques of the disclosure.

FIG. 9 illustrates a method 900 embodying techniques of the disclosure. Method 900 includes reading a value of a lower-level counter 902. The lower-level counter can be a counter of counters 206, 212, or 220 of FIG. 2. The lower-level counter can alternatively be a lower-level counter 804, 806, or 808 of FIG. 8. Next, a value to be stored in the lower-level counter can be adjusted 904. The adjusting of the value for the lower-level counter can comprise incrementing, decrementing, or otherwise changing a value read from the counter (such as at step 902). The changing of the value of the counter can occur in variously sized increments. For example, the lower-level counter can be incremented at one, two, or three increments at a time. Alternatively, the lower-level counter can be incremented by a number of bytes of a data packet. The changing of the value the lower-level counter can be associated with various counter tables, counters, or other memory constructs. For example, the change of value of lower-level counter can be associated with a transfer of network packets via a network device. Upon detection of an overflow of the lower-level counter, the method 900 can increase a range of the lower-level counter 906. Increasing the range of the lower-level counter 906 can enable the use of the lower-level counter to store a larger range of values than could otherwise be stored with the lower-level counter. The lower-level counter can be associated with an upper-level counter 908. This association can be performed in hardware, using a pointer, using a lookup table, or through various other means. For example, the association can be accomplished through the use of tags 812 or 824 FIG. 8. Tags 812 and 824 can be stored within memory space previously occupied by the value of the lower-level counter. A value of the upper-level counter can be changed accordingly to account for the optionally decreased capacity of the associated lower-level counter 910, as described herein. Increasing the range of lower-level counter 906 can enable the changing of the value of the low level counter 912 while avoiding an overflow of the lower-level counter, enabling the lower-level counter to store a larger range of values. Method of 900 can be completed multiple times using a singular lower-level counter such that the lower-level counter can be associated with a plurality of upper-level counters in sequential order. In this manner, the range of values stored by a lower-level counter can dynamically be increased in response to the value of the lower-level counter, for example.

Some or all of method 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 10:
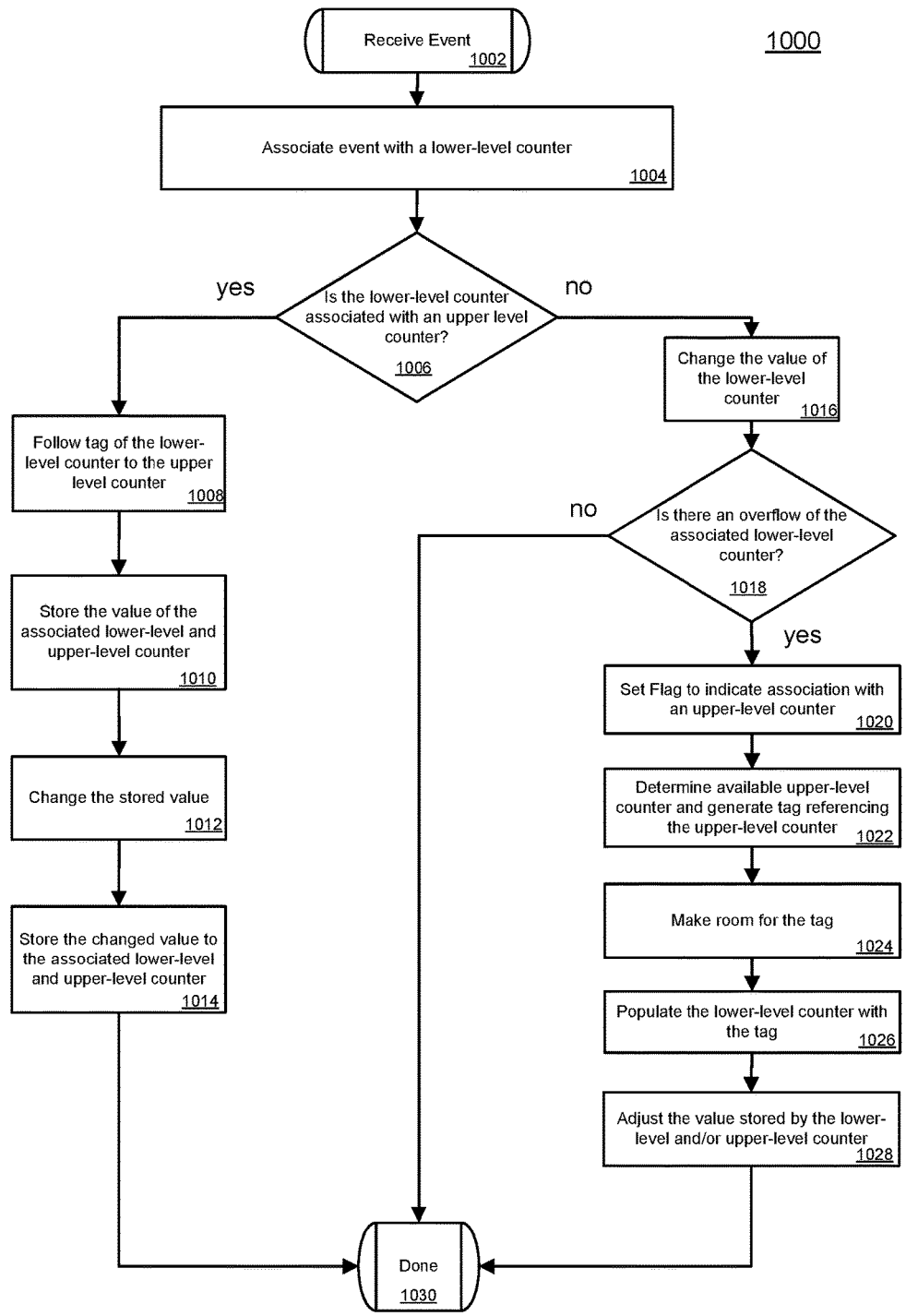
FIG. 10 illustrates an additional flowchart of a method that can embody techniques of the disclosure.

FIG. 10 illustrates a method 1000 embodying techniques of the disclosure for incrementing counter table 800, for example. Method 1000 begins by receiving an event 1002. The event can be any event associated with a counter table and can induce a change in value of an entry of the counter table. For example, an event can be a detection of an access to an entry in an associated routing table. At 1004, the event can be associated with a specific lower-level counter of the counter table. This association can be performed via a hashing function, a lookup table, or other function. For example, each lower-level counter of a counter table can be associated with a respective entry in a routing table. At 1006, a determination can be made as to if the specific lower-level counter associated with the event is associated with an upper-level counter. As described herein, a format of bits within a lower-level counter can be dependent upon if the lower-level counter is associated with an upper-level counter.

If the lower-level counter is associated with an upper-level counter, a tag of the lower-level counter can be followed to the associated upper-level counter 1008. A value represented by the lower-level value in conjunction with the upper-level counter can then be stored 1010 in, for example, a register. The value of the stored value can then be changed 1012 which can include incrementing or decrementing by a delta. The delta can be one of several values, as disclosed herein. The changed value can then be stored back in the lower-level counter and associated upper-level counter 1014 including updating fields of both or either counter. The process can then terminate 1030.

If the lower-level counter is not associated with an upper-level counter from the decision point 1006, a value of the lower-level counter can be changed 1016. The value can be incremented or decremented by one of several delta values as disclosed herein. A determination can then be made if the lower-level counter has overflowed 1018. If the lower-level counter has not overflowed, the process can terminate 1030. If there is a detected overflow, a flag of the lower-counter can be set to indicate association of the lower-level counter with an upper-level counter 1020. Next, an available upper-level counter can be determined and a tag referencing the available upper-level counter generated 1022. Room can then be made for storage of the generated tag within the lower-level counter 1024, as disclosed herein. Making room can include moving bits to the associated upper-level counter and/or temporarily storing a value stored within the lower-level counter. The lower-level counter can then be populated with the generated tag 1026. The value(s) of the lower-level counter and associated upper-level counter can then be adjusted 1028 such that the lower-level counter and associated upper-level counter store the correct value representing the previous value of the lower-level counter incremented or decremented by a delta value. The method can then terminate 1026 until a new event is received. Periodically, the lower-level counters, upper-level counters, association flags, and tags can be cleared and/or reset.

FIG. 11 illustrates a pipelined implementation of techniques of the disclosure. Illustrated is a pipeline stage diagram 1100. Horizontally are illustrated various stages/station of the pipelined functions. Vertically are illustrated incremental clock cycles to illustrate how an event can travel through each stage/station of the pipeline. For example, "Event 1" progresses between each stage/station of the pipeline sequentially from the first stage to the last illustrated/fifth stage. At the first stage, a lower-level counter is read. Reading of the lower level counter can include parsing the lower-level counter to obtain, for example, a flag (such as flag 814, 818, or 826 of FIG. 8), a value of the lower-level counter, and/or a tag (such as tag 812). The second stage can include determining if the lower-level counter is associated with an upper-level counter and incrementing (or decrementing) the lower-level counter. At the third stage, a determination can be made as to if the upper-level counter is associated and the lower-level counter overflows from the incrementing. If so, a value of the associated upper-level counter can be read. At the fourth stage, the value stored within the associated upper-level counter can be incremented, if necessary.

At the fifth stage, it can be determined if the lower-level counter overflowed, and if the lower-level counter is not associated with an upper-level counter, an upper-level can be associated with the lower-level counter. This can include setting a flag of the lower-level counter, writing a tag to the lower-level counter pointing to the upper-level counter, and writing appropriate values to the lower-level counter and/or upper-level counter. For example, techniques described herein can be used to move bits stored within the lower-level counter to the upper-level counter. Alternatively, if the lower level counter overflows and an upper-level counter is associated, updated value(s) can be written to the lower-level counter and associated upper-level counter. If the lower-level counter did not overflow and an upper-level counter is associated, only the lower-level counter needs to be written to. Pipeline collisions (hazards) can be identified and accounted for when, for example, there is more than one event in the pipeline updating the same counter. For example, Event 1 can update a certain lower-level counter and, in a subsequent clock cycle, Event 2 may attempt to update the same lower-level counter. In such a scenario, it may take five clock cycles before Event 1 is complete and the value of the lower-level counter has settled. Event 2 may therefore attempt to access the lower-level counter when its value is in an indeterminate state.

The use of pipelining and/or other techniques can aid in the implementation of a counter table that can support speeds necessary to be associated with network or other devices. For example, a counter table, as disclosed herein, can be associated with network activities such as incrementing counters in response to transferred network data packets such as at speeds of 100 gigabits per second or faster. Alternatively, a counter table can be associated with operations of a processing or other device that may operate at speeds on other order of several gigahertz or faster. Pipelining the implementation of such as counter table, especially a multi stage counter table as disclosed herein, can aid in supporting high speed operations regarding implementing counters, associating counters, setting counter flags, resetting counters, etc.

As described herein, counters of a counter table can be dumped periodically (for example, once every 2 seconds), such as when used to implement statistics gathering for a network device. The network device, as described herein, may have limited onboard memory. During a statistics dump, each of the counters of the counter table can be read and its current value transferred to, for example, external memory from the network device. The value of each counter can then be cleared. The external memory can be used to aggregate the values periodically read and cleared from the counter table.

The counters of the counter table, however, may still need to be able to accept counter increment requests while the statistics dump is occurring. Certain considerations may need to be taken into account when performing a statistics dump when using multi-level counters disclosed herein, especially if the counters are not read/cleared simultaneously. In such an instance, a time period between when a first counter is read for a statistics dump and when a last counter is read for a statistics dump can be called a statistics dump period. A period of time from the end of a first statistics dump to an end of a next statistics dump can be called a statistics measurement period. Note that the length of time required for a statistics dump can be variable, especially if the counter table is implemented in a pipelined fashion wherein incrementing values of the counter table can take priority over dumping of the counter table.

Counter increment requests and statistics dump reads can both access the counter tables through a same Counter Access Pipeline (CAP). Counter increment requests and statistics dump requests can be arbitrated for entry of each into the CAP. The CAP can have feedback paths from later stages in the pipeline back to earlier stages. The feedback paths can pass results from a completed counter access back to earlier stages in the pipeline for cases when multiple packets in the pipeline access the same counter.

As described herein, when a lower-level counter overflows, an upper-level counter can be assigned to increase range of values capable of being stored by the lower-level counter. Upper-level counters can be assigned in sequential index or other orders. Control logic for upper-level counter assignment can maintain two active pointers. The first pointer can be referred to as a first assigned active pointer. This pointer can hold an index of a first upper-level counter assigned in a current statistics measurement period, and may not change during a statistics dump period. The second pointer can be referred to as a next available active pointer. This pointer can contain an index of an upper-level counter to be assigned the next time the CAP requests an upper-level counter for association with a lower-level counter. When an upper-level counter is requested, the next available active pointer can be compared to the first assigned active pointer to determine if any upper-level counters are available. If the pointers are not equal, the upper-level counter can be assigned and the next available active pointer incremented.

When a statistics dump occurs all counters of a counter table can be read in sequential order, starting from a lower-level counter with index zero. Once the statistics dump completes, associations between upper-level counters and lower-level counters can be considered invalid (e.g. the associations may no longer be needed since the counters may have been cleared). When associations are broken, upper-level counters can be considered freed such that the upper-level counters can be available to be assigned as needed to a lower-level counter that overflows in a next statistics measurement period.

There can be two different cases that can be accounted for when assigning a freed upper-level counter to a lower-level counter:

Case 1: The lower-level counter entry has overflowed but the statistics dump read for this counter has not yet occurred. An upper-level counter can be assigned to this lower-level counter. But, for this case, the upper-level counter can be freed at the end of the statistics dump period because the lower-level counter and associated upper-level counter can be read during this statistics dump period.

Case 2: The lower-level counter has overflowed and the statistics dump read for this counter has already occurred. An upper-level counter can already be associated with the lower-level counter. But, for this case, the upper-level counter may not be freed at the end of the statistics dump period, because the lower-level counter and upper-level counter for this counter may not be able to be read (for a second time) during this statistics dump period. The counters can now contain statistics that can be read in the next statistics dump period.

When an upper-level counter is requested for association with a lower-level counter while a statistics dump is occurring, the CAP can compare the index of the overflowing lower-level counter against the lower-level counter index of the most recent statistics dump read access. If, for example, an index of an overflowed lower-level counter is less than or equal to an index of a lower-level counter most recently read for a statistics dump, then Case 2 can be determined to have occurred.

Upper-level counters assigned to lower-level counters under a Case 2 condition may not be freed at the end of the statistics dump period. To prevent this, control logic for upper-level counters assignment can maintain two future pointers designated the next available future pointer and the first assigned future pointer. During a statistics dump, on the first occurrence of the detection of a Case 2 instance, the first assigned future pointer can be set to point to the same upper-level counter as the next available active pointer. The next available future pointer can be set to the next available active pointer plus one (if the upper-level counters are assigned sequentially). Then the next available active pointer can be incremented by one. On each subsequent occurrence of Case 2 the next available future pointer can be set to the next available active pointer plus one. Then, the next available active pointer can be incremented by one. The first assigned future pointer can be unchanged.

Occurrences of Case 1 may not cause the future pointers to change, but the next available active pointer can be incremented by one. When a statistics dump period is complete, the future pointers can become the active pointers. If no instances of Case 2 occur during a statistics dump, then the first assigned active pointer can be moved to the current location of the next available active pointer upon the completion of the statistics dump.

Figure 12:
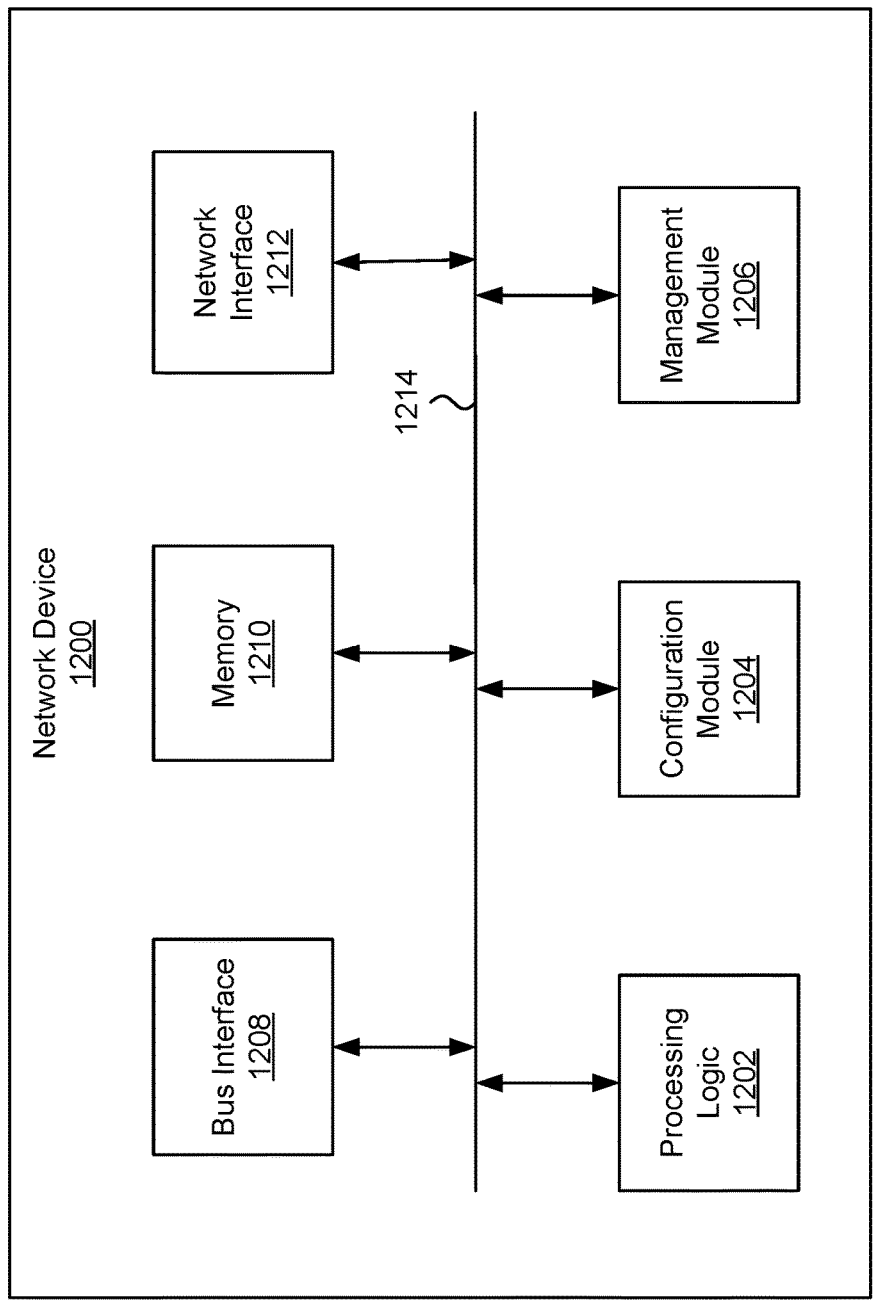
FIG. 12 illustrates an example of a network device, according to certain aspects of the disclosure.

FIG. 12 illustrates an example of a network device 1200. Functionality and/or several components of the network device 1200 may be used without limitation with other embodiments disclosed elsewhere in this disclosure, without limitations. A network device 1200 may facilitate processing of packets and/or forwarding of packets from the network device 1200 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1200 may be the recipient and/or generator of packets. In some implementations, the network device 1200 may modify the contents of the packet before forwarding the packet to another device. The network device 1200 may be a peripheral device coupled to another computer device, a switch, a router or any other suitable device enabled for receiving and forwarding packets.

In one example, the network device 1200 may include processing logic 1202, a configuration module 1204, a management module 1206, a bus interface module 1208, memory 1210, and a network interface module 1212. These modules may be hardware modules, software modules, or a combination of hardware and software. In certain instances, modules may be interchangeably used with components or engines, without deviating from the scope of the disclosure. The network device 1200 may include additional modules, not illustrated here, such as components discussed with respect to the nodes disclosed in FIG. 13. In some implementations, the network device 1200 may include fewer modules. In some implementations, one or more of the modules may be combined into one module. One or more of the modules may be in communication with each other over a communication channel 1214. The communication channel 1214 may include one or more busses, meshes, matrices, fabrics, a combination of these communication channels, or some other suitable communication channel.

The processing logic 1202 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1202 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1202 may be stored on a computer-readable storage medium, for example, in the form of a computer program. The computer-readable storage medium may be non-transitory. In some cases, the computer-readable medium may be part of the memory 1210.

The memory 1210 may include either volatile or non-volatile, or both volatile and non-volatile types of memory. The memory 1210 may, for example, include random access memory (RAM), read only memory (ROM), Electrically Erasable Programmable Read-Only Memory (EEPROM), flash memory, and/or some other suitable storage media. In some cases, some or all of the memory 1210 may be internal to the network device 1200, while in other cases some or all of the memory may be external to the network device 1200. The memory 1210 may store an operating system comprising executable instructions that, when executed by the processing logic 1202, provides the execution environment for executing instructions providing networking functionality for the network device 1200. The memory may also store and maintain several data structures and routing tables for facilitating the functionality of the network device 1200.

In some implementations, the configuration module 1204 may include one or more configuration registers. Configuration registers may control the operations of the network device 1200. In some implementations, one or more bits in the configuration register can represent certain capabilities of the network device 1200. Configuration registers may be programmed by instructions executing in the processing logic 1202, and/or by an external entity, such as a host device, an operating system executing on a host device, and/or a remote device. The configuration module 1204 may further include hardware and/or software that control the operations of the network device 1200.

In some implementations, the management module 1206 may be configured to manage different components of the network device 1200. In some cases, the management module 1206 may configure one or more bits in one or more configuration registers at power up, to enable or disable certain capabilities of the network device 1200. In certain implementations, the management module 1206 may use processing resources from the processing logic 1202. In other implementations, the management module 1206 may have processing logic similar to the processing logic 1202, but segmented away or implemented on a different power plane than the processing logic 1202.

The bus interface module 1208 may enable communication with external entities, such as a host device and/or other components in a computing system, over an external communication medium. The bus interface module 1208 may include a physical interface for connecting to a cable, socket, port, or other connection to the external communication medium. The bus interface module 1208 may further include hardware and/or software to manage incoming and outgoing transactions. The bus interface module 1208 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1208 may include the physical layer for any of these bus protocols, including a connector, power management, and error handling, among other things. In some implementations, the network device 1200 may include multiple bus interface modules for communicating with multiple external entities. These multiple bus interface modules may implement the same local bus protocol, different local bus protocols, or a combination of the same and different bus protocols.

The network interface module 1212 may include hardware and/or software for communicating with a network. This network interface module 1212 may, for example, include physical connectors or physical ports for wired connection to a network, and/or antennas for wireless communication to a network. The network interface module 1212 may further include hardware and/or software configured to implement a network protocol stack. The network interface module 1212 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1200 may include multiple network interface modules, each configured to communicate with a different network. For example, in these implementations, the network device 1200 may include a network interface module for communicating with a wired Ethernet network, a wireless 802.11 network, a cellular network, an Infiniband network, etc.

The various components and modules of the network device 1200, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 13.

Figure 13:
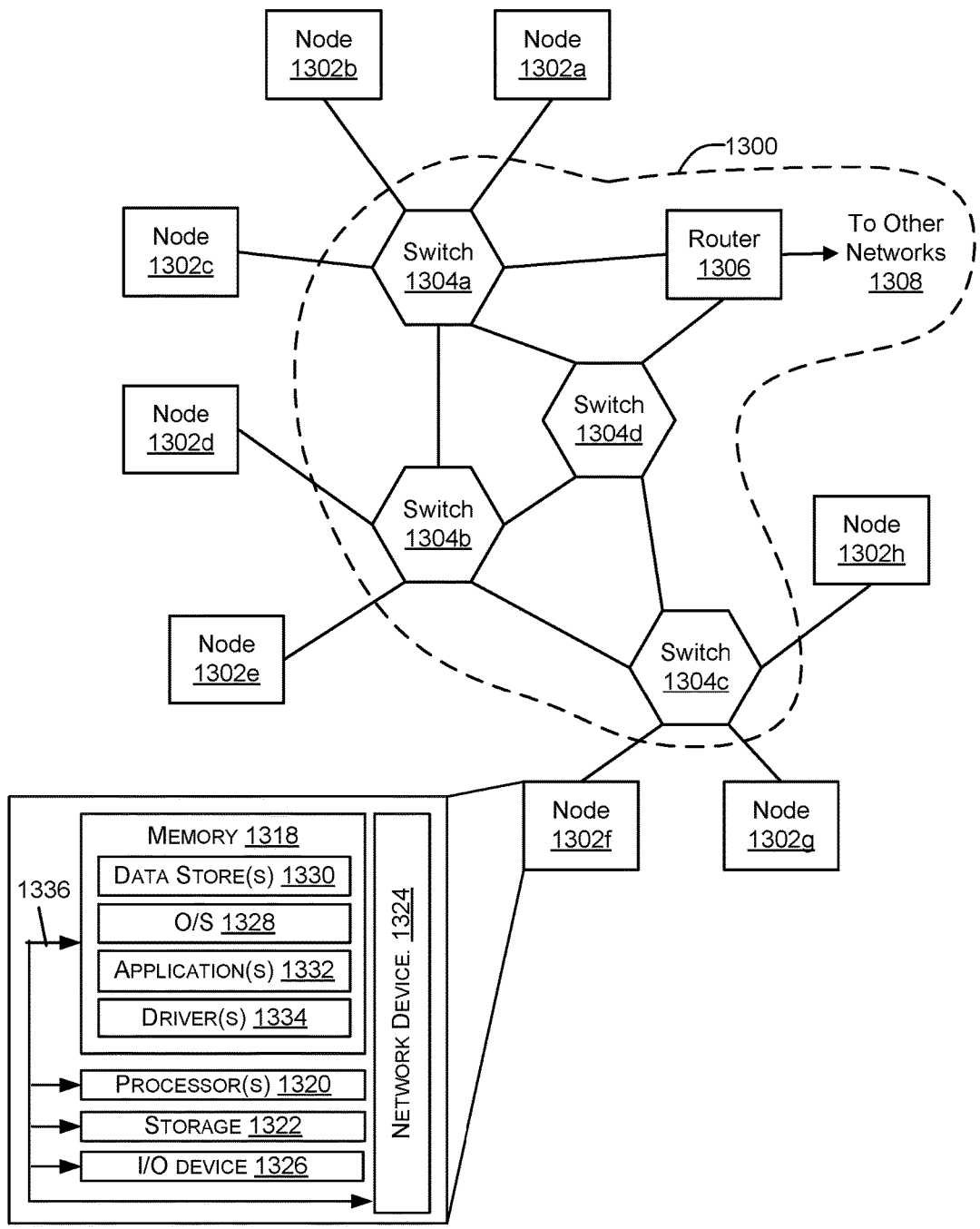
FIG. 13 illustrates an example architecture for features and systems described herein that includes one or more service provider computers and/or a user device connected via one or more networks, according to certain aspects of the disclosure.

FIG. 13 illustrates a network 1300, illustrating various different types of network devices 1200 of FIG. 12, such as nodes comprising the network device, switches and routers. In certain embodiments, the network 1300 may be based on a switched architecture with point-to-point links. As illustrated in FIG. 13, the network 1300 includes a plurality of switches 1304a-1304d, which may be arranged in a network. In some cases, the switches are arranged in a multi-layered network, such as a Clos network. A network device 1200 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1304a-1304d may be connected to a plurality of nodes 1302a-1302h and provide multiple paths between any two nodes.

The network 1300 may also include one or more network devices 1200 for connection with other networks 1308, such as other subnets, LANs, wide area networks (WANs), or the Internet, and may be referred to as routers 1306. Routers use headers and forwarding tables to determine the best path for forwarding the packets, and use protocols such as internet control message protocol (ICMP) to communicate with each other and configure the best route between any two devices.

In some examples, network(s) 1300 may include any one or a combination of many different types of networks, such as cable networks, the Internet, wireless networks, cellular networks and other private and/or public networks. Interconnected switches 1304a-1304d and router 1306, if present, may be referred to as a switch fabric, a fabric, a network fabric, or simply a network. In the context of a computer network, terms "fabric" and "network" may be used interchangeably herein.

Nodes 1302a-1302h may be any combination of host systems, processor nodes, storage subsystems, and I/O chassis that represent user devices, service provider computers or third party computers.

User devices may include computing devices to access an application 1332 (e.g., a web browser or mobile device application). In some aspects, the application 1332 may be hosted, managed, and/or provided by a computing resources service or service provider. The application 1332 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1308. Additionally, the user device(s) may be part of the distributed system managed by, controlled by, or otherwise part of the service provider computer(s) (e.g., a console device integrated with the service provider computers).

The node(s) of FIG. 13 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1332 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1302a-1302h may include at least one memory 1318 and one or more processing units (or processor(s) 1320). The processor(s) 1320 may be implemented in hardware, computer-executable instructions, firmware, or combinations thereof. Computer-executable instruction or firmware implementations of the processor(s) 1320 may include computer-executable or machine-executable instructions written in any suitable programming language to perform the various functions described.

In some instances, the hardware processor(s) 1320 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1318 may store program instructions that are loadable and executable on the processor(s) 1320, as well as data generated during the execution of these programs. Depending on the configuration and type of the node(s) 1302a-1302h, the memory 1318 may be volatile (such as RAM) and/or non-volatile (such as ROM, flash memory, etc.). The memory 1318 may include an operating system 1328, one or more data stores 1330, one or more application programs 1332, one or more drivers 1334, and/or services for implementing the features disclosed herein.

The operating system 1328 may support nodes 1302a-1302h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1328 may also be a proprietary operating system.

The data stores 1330 may include permanent or transitory data used and/or operated on by the operating system 1328, application programs 1332, or drivers 1334. Examples of such data include web pages, video data, audio data, images, user data, and so on. The information in the data stores 1330 may, in some implementations, be provided over the network(s) 1308 to user devices 1304. In some cases, the data stores 1330 may additionally or alternatively include stored application programs and/or drivers. Alternatively or additionally, the data stores 1330 may store standard and/or proprietary software libraries, and/or standard and/or proprietary application user interface (API) libraries. Information stored in the data stores 1330 may be machine-readable object code, source code, interpreted code, or intermediate code.

The drivers 1334 include programs that may provide communication between components in a node. For example, some drivers 1334 may provide communication between the operating system 1328 and additional storage 1322, network device 1324, and/or I/O device 1326. Alternatively or additionally, some drivers 1334 may provide communication between application programs 1332 and the operating system 1328, and/or application programs 1332 and peripheral devices accessible to the service provider computer. In many cases, the drivers 1334 may include drivers that provide well-understood functionality (e.g., printer drivers, display drivers, hard disk drivers, Solid State Device drivers). In other cases, the drivers 1334 may provide proprietary or specialized functionality.

The service provider computer(s) or servers may also include additional storage 1322, which may include removable storage and/or non-removable storage. The additional storage 1322 may include magnetic storage, optical disks, solid state disks, flash memory, and/or tape storage. The additional storage 1322 may be housed in the same chassis as the node(s) 1302a-1302h or may be in an external enclosure. The memory 1318 and/or additional storage 1322 and their associated computer-readable media may provide non-volatile storage of computer-readable instructions, data structures, program modules, and other data for the computing devices. In some implementations, the memory 1318 may include multiple different types of memory, such as SRAM, DRAM, or ROM.

The memory 1318 and the additional storage 1322, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1318 and the additional storage 1322 are examples of computer storage media. Additional types of computer storage media that may be present in the node(s) 1302a-1302h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1302a-1302h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1302a-1302h may also include I/O device(s) 1326, such as a keyboard, a mouse, a pen, a voice input device, a touch input device, a display, speakers, a printer, and the like. The node(s) 1302a-1302h may also include one or more communication channels 1336. A communication channel 1336 may provide a medium over which the various components of the node(s) 1302a-1302h can communicate. The communication channel or channels 1336 may take the form of a bus, a ring, a switching fabric, or a network.

The node(s) 1302a-1302h may also contain network device(s) 1324 that allow the node(s) 1302a-1302h to communicate with a stored database, another computing device or server, user terminals and/or other devices on the network(s) 1300. The network device(s) 1324 of FIG. 13 may include similar components discussed with reference to the network device 1200 of FIG. 12.

In some implementations, the network device 1324 is a peripheral device, such as a PCI-based device. In these implementations, the network device 1324 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1208 may implement NVMe, and the network device 1324 may be connected to a computing system using a PCIe interface.

A PCI-based device may include one or more functions. A "function" describes operations that may be provided by the network device 1324. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1324 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, FIG. 13, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit, comprising:
   a memory;
   a plurality of lower-level counters stored in the memory;
   a plurality of upper-level counters stored in the memory; and
   wherein:
      a number of lower-level counters is greater than a number of upper-level counters;
      the integrated circuit is configured to, upon detection of an overflow of one of the lower-level counters, enlarge a range of values capable of being represented by the one lower-level counter by associating the one lower-level counter with one of the upper-level counters; and
      the associating includes storing a tag within the one lower-level counter, wherein the tag references the associated upper-level counter.

2. The integrated circuit of claim 1, wherein:
   a first total number of bits of the memory implements the plurality of lower-level counters and the plurality of upper-level counters;
   the first total number of bits is less than a second total number of bits, the second total number of bits implementing a number of one-level counters equal to a number of the plurality of lower-level counters;
   each one-level counter is configured to store a range of values capable of being represented by a lower-level counter of the plurality of upper-level counters associated with an upper-level counter of the plurality of upper-level counters; and
   the integrated circuit is configured to clear the plurality of lower-level counters and the plurality of upper-level counters to prevent the plurality of lower-level counters and the plurality of upper-level counters from exceeding a capacity of events capable of being stored by the plurality of upper-level counters and plurality of lower-level counters.

3. The integrated circuit of claim 1, further comprising a network port and wherein the lower-level counter is associated with the network port.

4. The integrated circuit of claim 1, wherein a flag is associated with the lower-level counter, the flag configurable in a first state to indicate that the lower-level counter is associated with the one upper-level counter and configurable in a second state to indicate that the lower-level counter is not associated with the one upper-level counter.

5. An apparatus, comprising:
   a memory;
   a plurality of lower-level counters stored in the memory;
   a plurality of upper-level counters stored in the memory; and
   logic circuitry configured to, responsive to detecting an overflow of a lower-level counter of the plurality of lower-level counters:
      designate a pre-determined number of bits of the low-level counter as a tag memory, and
      store a value at the tag memory counter, wherein the value stored at the tag memory is configured to reference an upper-level counter of the plurality of upper-level counters.

6. The apparatus of claim 5, wherein the lower-level counter is selected from any of the plurality of lower-level counters stored in the memory.

7. The apparatus of claim 5, wherein the memory and the logic circuitry are included in a same integrated circuit die.

8. The apparatus of claim 5, wherein a flag is associated with the lower-level counter, the flag configured to indicate whether the lower-level counter is associated with the upper-level counter and the flag stored in the memory.

9. The apparatus of claim 5, wherein a range of values capable of being represented by the lower-level counter when the lower-level counter is not associated with the upper-level counter is less than the range of values capable of being represented by the lower-level counter when it is associated with the upper-level counter.

10. The apparatus of claim 5, wherein the logic circuitry is further configured to change a value stored at the lower-level counter on every clock cycle of a clock associated with the logic circuitry.

11. The apparatus of claim 5, further comprising a network port and wherein the lower-level counter is associated with the network port.

12. The apparatus of claim 11, wherein the logic circuitry is configured to increment a value stored at the lower-level counter to obtain statistical information associated with data transferred via the network port.

13. The apparatus of claim 12, wherein the logic circuitry is configured to:
   remove the association of the lower-level counter with the upper-level counter at end of a dumping period of the statistical information based on the lower-level counter overflowing before the dumping of the statistical information from the low-level counter starts.

14. The apparatus of claim 12, wherein the logic circuitry is configured to:
   maintain the association of the lower-level counter with the upper-level counter at end of a dumping period of the statistical information based on the lower-level counter overflowing after the dumping of the statistical information from the low-level counter starts.

15. The apparatus of claim 5, wherein a number of the plurality of lower-level counters is different from a number of the plurality of upper-level counters.

16. A method, comprising:
   identifying, by a computer system, an event for which statistical information is to be captured using a counter table including a plurality of lower-level counters;
   changing, by the computer system, a value stored at a lower-level counter of the plurality of lower-level counters to store statistical information regarding the event, the plurality of lower-level counters stored in a memory of the computer system;
   detecting, by the computer system, whether changing the value stored at the lower-level counter results in an overflow of the lower-level counter; and
   upon detection of an overflow of the lower-level counter:
      designating a pre-determined number of bits of the low-level counter as a tag memory, and
      storing a tag value at the tag memory, wherein the tag value references an upper-level counter of a plurality of upper-level counters.

17. The method of claim 16, wherein the changing the value stored at the lower-level counter further comprises:
   determining that the lower-level counter is associated with an upper-level counter of a plurality of upper-level counters of the counter table;
   upon determining that the lower-level counter is associated with the upper-level counter, determining if values stored at the lower-level counter and the upper-level counter need to be changed to store the statistical information regarding the event; and
   upon determining that the values stored at the lower-level counter and the upper-level counter need to be changed to store the statistical information regarding the event, changing the values stored at the lower-level counter and the upper-level counter.

18. The method of claim 16, further comprising:
   clearing the value stored at the lower-level counter; and
   upon clearing the value stored at the lower-level counter, releasing, by the computer system, a number of memory bits of the memory allocated to the lower-level counter to enlarge a range of values capable of being stored using another lower-level counter.

19. The method of claim 17, further comprising, within a same clock cycle of a clock associated with the plurality of lower-level counters, reading a value stored at a first lower-level counter of the plurality of lower-level counters and writing to a second lower-level counter of the plurality of lower-level counters.

20. The method of claim 17, further comprising, within a time period, reading values stored at each of the plurality of lower-level counters, wherein the time period includes a plurality of clock cycles and a value stored at each of the plurality of lower-level counters is read during a different clock cycle of the plurality of clock cycles.

21. The method of claim 20, wherein the lower-level counter is associated with an upper-level counter to increase the number of memory bits of the memory allocated to the lower-level counter; and
   the method further comprises reading from the upper-level counter at a different clock cycle of the plurality of clock cycles than the lower-level counter.

22. The method of claim 21, further comprising:
   reading from the lower-level counter within the time period; and
   preventing the upper-level counter from being cleared during the time period.

23. The method of claim 16, wherein a number of the plurality of lower-level counters is different from a number of the plurality of upper-level counters.

* * * * *